United States Patent [19]
Geisinger

[11] Patent Number: 5,042,290
[45] Date of Patent: Aug. 27, 1991

[54] ISOLATOR FOR LEAK DETECTOR TESTER

[75] Inventor: Penrod C. Geisinger, Dewey, Ariz.

[73] Assignee: Vaporless Manufacturing, Inc., Prescott Valley, Ariz.

[21] Appl. No.: 479,653

[22] Filed: Feb. 14, 1990

[51] Int. Cl.⁵ ............................................. G01M 3/04
[52] U.S. Cl. .................................. 73/40.5 R; 73/40; 222/23
[58] Field of Search .................. 73/40.5 R, 40; 222/23

[56] References Cited

U.S. PATENT DOCUMENTS

| | | | |
|---|---|---|---|
| 3,236,256 | 2/1966 | Valentine | 137/509 |
| 3,454,195 | 8/1969 | Deters | 73/40.5 R |
| 3,817,087 | 6/1974 | Mooney | 73/40.5 R |
| 4,269,061 | 5/1981 | Hatsuno et al. | 73/40 |
| 4,573,343 | 3/1986 | Huiber | 73/40.5 R |
| 4,576,037 | 3/1986 | Cox | 73/40.5 R |
| 4,679,587 | 7/1987 | Jarr | 73/40.5 R |

OTHER PUBLICATIONS

Engineering Report "The PLD Piston Leak Detector", Red Jacket Pumps, Feb. 1987.
Engineering Report, "Leak Detector", Red Jacket Pumps, Jan., 1985.

Primary Examiner—Hezron E. Williams
Assistant Examiner—William Francos
Attorney, Agent, or Firm—Cahill, Sutton & Thomas

[57] ABSTRACT

A tester, temporarily connectable to a tap in the input line for a gasoline dispenser, tests the integrity of the delivery line from a submerged pump within a gasoline storage tank to the tap, including a leak detector, whether piston or diaphragm operated, normally mounted at the storage tank downstream of the submerged pump. An in line isolator is installed between the submerged pump output line and the leak detector to make a field test of the integrity and operability of the leak detector.

12 Claims, 3 Drawing Sheets

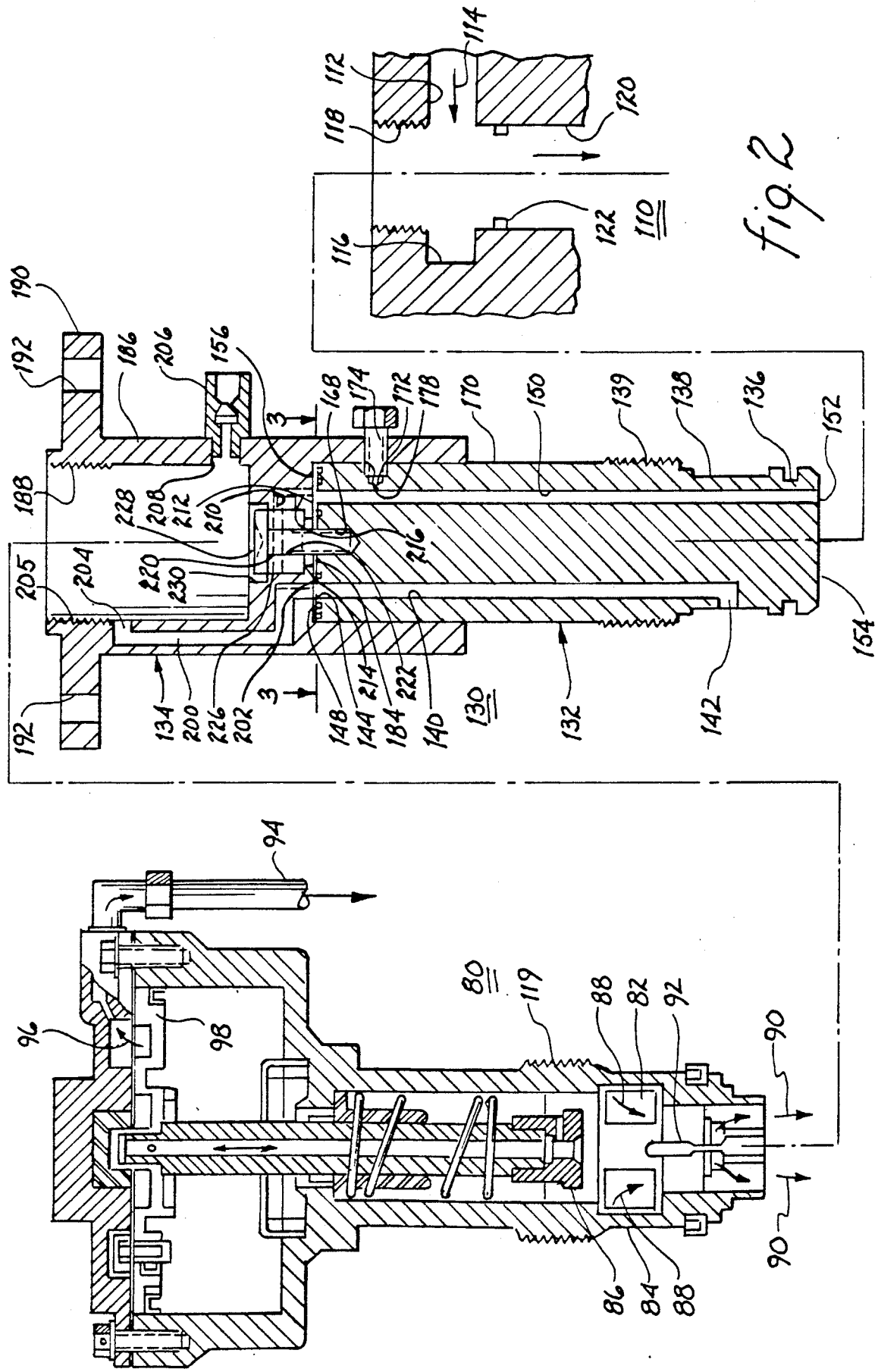

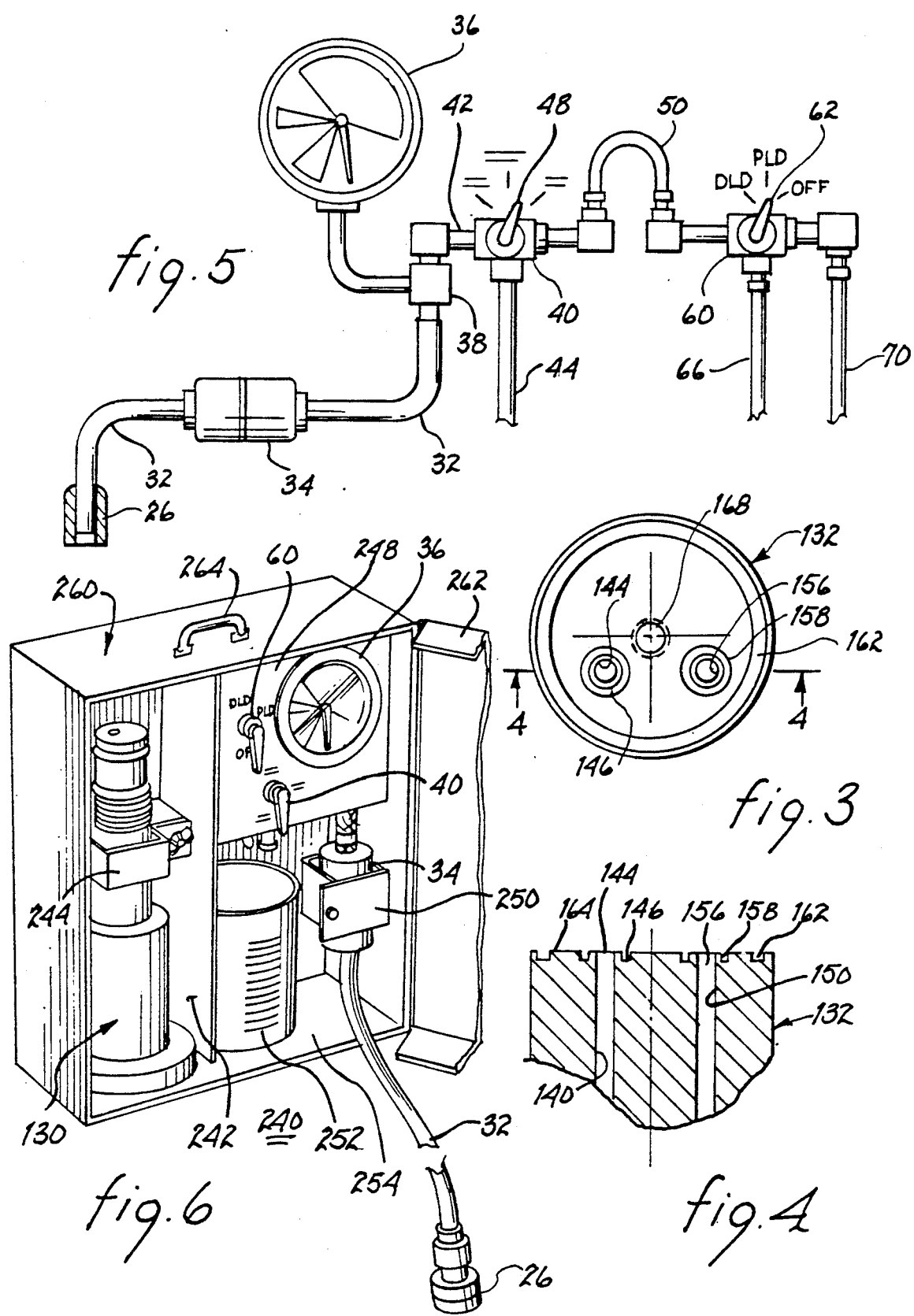

ISOLATOR FOR LEAK DETECTOR TESTER

BACKGROUND OF THE INVENTION

1. Field of the Invention

The present invention relates to fluid leak testers and, more particularly, to an isolator for a leak detector to detect proper operability of the leak detector and the delivery lines in a gasoline dispensing system.

2. Description of the Prior Art

Retail gasoline stations dispense different grades of gasoline and diesel fuel for automotive vehicles. These fuels are stored in respective storage tanks underground and dispensed from respective pumps for the benefit of retail users. A submerged pump is disposed in the storage tank to provide fuel under pressure at the dispenser. It is well known that leaks can and do occur between the output of the storage tank and the input of the dispenser. These leaks may result from destructive forces resulting from settling of the storage tank. Vehicular movement over the ground may cause a shift of the earth and impose sufficient forces to affect the integrity of junctions or unions disposed along the fuel delivery line. Rocks or other hard substances may impinge upon and wear or otherwise dimple the delivery line sufficiently to develop a leak. Sometimes corrosion due to acids or salts will affect the integrity of the delivery line or a seal at a junction.

Because of the long term destructive effects of seepage of fuel in the ground, the Environmental Protection Agency has established requirements which eliminate or at least reduce future ground contamination. To comply with these requirements, as well as to reduce fuel losses and the attendant economic detriments, a device generically known as a leak detector is mounted at the storage tank. This leak detector is disposed between the output of the submerged pump within the storage tank and the input to the line delivering fuel from the storage tank to the dispenser.

Such a leak detector has three operative states. In the relaxed state prior to energization of the submerged pump, a flow into the delivery line at the rate of 1.5 to 3 gpm is permitted. Upon energization of the submerged pump, a poppet valve is partly actuated to limit flow through the leak detector to a rate of 3 gph. Assuming that the delivery line has a leak of less than 3 gph, the pressure within the leak detector will build rapidly (approximately 2 seconds) and the valve will go to the fully open position to permit unimpeded fuel delivery. If there is a leak greater than 3 gph, insufficient pressure will build up to permit full delivery. Alternatively, a leak close to but less than 3 gph will increase the time required to go to the full delivery position.

These leak detectors, for the most part, perform admirably well over long periods of time with limited maintenance. Unfortunately, due to wear and contamination, the leak detector may permit full delivery even though a leak greater than 3 gph may be present. Because fuel is still delivered after an initial hesitation period, the gasoline station operator may not be aware of the existence of a leak. The leak detectors are periodically tested but such testing of a leak detector independently of influence of the delivery system requires removal of the leak detector to a laboratory-like environment. The resulting delays and expenses tend to encourage infrequent testing.

SUMMARY OF THE INVENTION

A tester is connected to a tap at the input line to a gasoline dispenser to simulate a normal fuel delivery cycle. During such simulation, the pressure, timing and incremental fuel dispensation are measured to determine whether the leak detector disposed in the system is functioning properly. Flow restrictors are incorporated and selectable to test both diaphragm and piston leak detectors. In the event a problem is determined to exist, an in line isolator is installed between the output line of the storage tank submerged pump and the leak detector to test the leak detector. On completion of the test, the isolator is removed the leak detector reinstalled or replaced.

It is therefore an object of the present invention to provide a tester for testing the integrity and operability of leak detector installed gasoline delivery systems.

Another object of the present invention is to provide a tester for in field testing of a submersible pump mounted leak detector.

Yet another object of the present invention is to provide a tester for determining compliance with permissible gasoline leakage parameters attendant gasoline delivery systems.

Yet another, object of the present invention is to provide an in line isolator for in field testing of a conventional leak detector attendant a gasoline storage tank.

A further object of the present invention is to provide an easy to use isolator for testing the integrity of the leak detector of a gasoline fuel delivery line.

A still further object of the present invention is to provide a method for detecting the presence of unacceptable leaks in a gasoline delivery system at a gasoline station.

A yet further object of the present invention is to provide a method for in field testing of a leak detector used with a gasoline delivery system.

These and other objects of the present invention will become apparent to those skilled in the art as the description thereof proceeds.

BRIEF DESCRIPTION OF THE DRAWINGS

The present invention will be described with greater clarity and specificity with reference to the following drawings, in which:

FIG. 2 is an expanded view of an insert for supporting a leak detector during specific testing of the leak detector;

FIG. 3 is a cross sectional view taken along lines 3—3 as shown in FIG. 2;

FIG. 4 is a partial cross sectional view taken along lines 4—4 as shown in FIG. 3;

FIG. 5 illustrates the fluid control and monitoring apparatus of the tester; and FIG. 6 illustrates a portable cabinet for housing the operative elements of the tester for in field use.

DESCRIPTION OF THE PREFERRED EMBODIMENT

Figure 1:
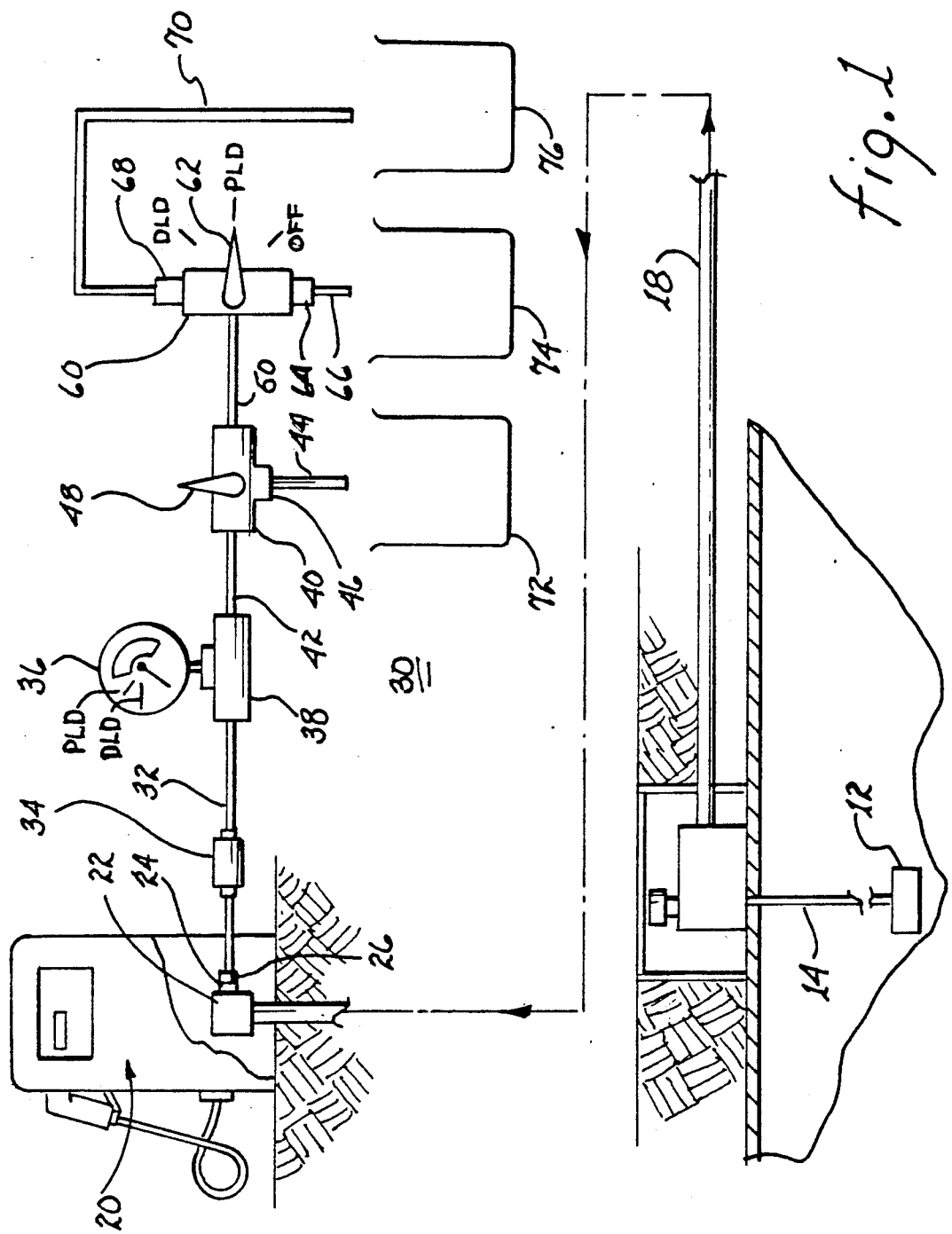
FIG. 1 is a representative illustration of the tester and associated gasoline delivery system under test.

Referring to FIG. 1, there is shown a conventional underground storage tank 10 for storing gasoline at a retail gas station or the like. A submersed pump 12 is mounted within the storage tank to expel gasoline through line 14. A conventional leak detector 16, which may be of the piston (PLD) or diaphragm (DLD) type, is in fluid communication with line 14 to interconnect it with dispensing line 18. The dispensing line conveys gasoline to a dispenser 20 commonly called a gas pump and found at every service station. The gas pump includes a safety valve 22 having a tap 24.

Tester 30 is connected to tap 24 via a hose 32. Because flow rates are to be precisely measured with orifices, needle valves, or the like, it is important that particulate contaminants be excluded from the tester. Hence, a filter 34 is placed in line with hose 32. A pressure gauge 36 is connected to hose 32 via a fitting 38 to provide an indication of the pressure present within hose 32, dispensing line 18 and at the output of leak detector 16. A three position selector valve 40 is connected to pressure gauge 36 via line 42. An output line 44 is connected to the selector valve through a flow metering device, such as an orifice 46.

The orifice controls the flow through output line 44 to correspond with the three gph (3 gph) position of selector handle 48. A second output line 50 conveys flow upon placement of handle 48 in the dispenser nozzle position. To prevent fluid flow through the selector valve, handle 48 is placed in the pressure test position.

Output line 50 is connected to the input of a further three position selector valve 60 having handle 62. A flow metering device, such as an orifice 64, regulates outflow from selector valve 60 through output line 66. Flow through this output line corresponds with the PLD (Piston Leak Detector) position of handle 62. Orifice 64 is sized commensurate with the parameters of the PLD leak detector. A further flow regulating mechanism, such as an orifice 68, regulates fluid flow from the selector valve into output line 70. Flow through this output line corresponds with the DLD (Diaphragm Leak Detector) position of handle 62. Orifice 68 is sized commensurate with the parameters of the DLD leak detector. When handle 62 is in the "off" position, flow through the selector valve is precluded. A beaker or container, such as one of containers 72,74 and 76, is associated with output lines 44,66 and 70 to collect, for measurement and timing purposes, outflow from the output lines. It is to be understood that a single container may be used to serially collect outflow from the respective output lines as the tests progress.

Referring to FIG. 2, there is illustrated a well known conventional leak detector 80 having a piston as the operative element. Another type of well known leak detector has a diaphragm as the operative element. Leak detectors of this type are known as a Red Jacket piston leak detector, Model No. 116-030, and Red Jacket 2-second leak detector, Model 116-017 (and the old style round dome casting 5-second leak detector, Model 116-011A), respectively. These leak detectors are manufactured by the Marley Pump Company.

Leak detector 80 includes a plenum 82 having apertures disposed in cylindrical side wall 84 for receiving a flow of gasoline from the submerged pump disposed within a gasoline storage tank. A poppet 86, interacting with fluid flow channeling and pressure differentials, accommodates an initial flow rate for a limited period of time upon actuation of the submersed pump. Without the presence of a leak, the poppet opens fully to permit gasoline inflow, as depicted by arrows 88, and gasoline outflow, as depicted by arrows 90, under a pressure of approximately 26 psi. at an essentially unrestricted rate. During the interim flow period, a metering pin 92 regulates the flow rate. The leak detector, in the piston version illustrated, includes an overflow 94 feeding back into the storage tank to permit outflow, as indicated by arrows 96, of gasoline disposed above piston 98. The diaphragm type leak detector (DLD) is similar in operation to the piston leak detector (PLD) illustrated in FIG. 2 except that a diaphragm serves the function of piston 98 and overflow 94 is absent.

Leak detector 80 is mounted within an industry standard housing 110 depicted in FIG. 2. This housing includes a passageway 112 in fluid communication with line 14 connected to the output of submerged pump 12 (see FIG. 1). To accommodate fluid flow, as depicted by arrow 114, from passageway 112 into plenum 82 of leak detector 80, an annular channel 116 is disposed in the side wall of housing 110 and coincident with passageway 112. A threaded section 118 receives and supports a threaded section 119 of the leak detector. On installation of the leak detector in housing 110, plenum 82 and apertures 84 are coincident with annular channel 116 and passageway 112. An outlet 120 is disposed at the lower end of housing 110, which outlet is in communication with dispensing line 18 (as shown in FIG. 1). To prevent fluid flow bypass, a seal 122, or the like, is disposed downstream of annular channel 116 to engage the lower end of the leak detector and prevent unwanted bypass flow.

To test leak detector 80 subsequent to certain initial tests which determine that a potential leakage problem exists, whether in the line or in a malfunctioning leak detector, an isolator 130 is interposed between housing 110 and leak detector 80, as shown in FIG. 2. The isolator includes two primary components, a base 132 and a receiver 134. The base has a lower end sized and configured externally to replicate the part of leak detector 80 seated within housing 110. Specifically, a channel 136 is included for sealing engagement with seal 122. An annular groove 138 is formed coincident with passageway 112 and annular depression 116. External threads 139 threadedly engage threads 118. Thereby, base 132 is lodged and secured within housing 110.

Referring jointly to FIGS. 2, 3 and 4, base 132 will be described in further detail. The base includes a passageway 140 having an inlet 142 disposed in annular groove 138. Outlet 144 is surrounded by an annular depression 146 for receiving an O ring 148. A further passageway 150 extends from outlet 152 at bottom end 154 of the base to inlet 156. An annular depression 158 is formed about inlet 156 to receive an O ring 160. A further annular depression 162 extends about upper end 164 of base 132 to receive an O ring 166. A threaded cavity 168 is centrally formed in base 132 and extends downwardly from upper end 164. Cylindrical side wall 170 of the base includes a radially extending threaded cavity 172 for receiving threaded shank 174 of a knob 176.

Receiver 134 includes a skirt 180 defining a cylindrical cavity 182 for receiving the upper end of base 132. The cavity is upwardly terminated by a circular end 184. The upper part of receiver 134 includes a further skirt 186 defining a cylindrical cavity 188. Cylindrical cavity 188 is configured in diameter and length to receive, threadedly engage threads 119 with threads 205 and sealingly engage the lower end of leak detector 80 to accommodate fluid flow through ports 84 into plenum 82 along with outflow (arrows 90) of fluid from the leak detector. An annular flange 190, along with holes 192 formed therein, may be used in conjunction with a retaining member (not shown) for engaging the leak detector and securing the leak detector to isolator 130.

A passageway 200 includes an inlet 202 formed in circular end 184 and an outlet 204 disposed in the wall of cylindrical cavity 188. The position of outlet 204 is commensurate with apertures 84 formed in leak detector 80 when the leak detector is mounted in receiver 134. A female quick disconnect fitting 206 is mated with outlet 208 formed in skirt 186 at the lower end of cylindrical cavity 188. When leak detector 80 is mounted within receiver 134, outlet 208 is positioned to receive the gas outflow (90) from the leak detector. Cross channel 210 interconnects with passageway 200. Outlet 212 of the cross channel is disposed in circular end 184.

A bolt 220 extends through an aperture 222 formed in interface 224 between cylindrical cavity 182 and cylindrical cavity 188. A bearing 226, which may be a disc and also serve the function of a seal, is disposed in an annular expanded segment of aperture 222 to support head 228 of the bolt. A further annularly expanded segment 230 of aperture 222 may be incorporated to receive head 228. The threaded shank of bolt 220 engages threaded cavity 168 to draw base 132 and receiver 134 together. By using a bearing to support the head of the bolt, relative rotation about the longitudinal axis of the base and the receiver may be effected. Furthermore, tightening of the bolt draws circular end 184 against O rings 148,160 and 162 to seal the respective circumscribed outlets/inlets to prevent leakage at the junction between the base and the receiver. Skirt 180 includes a slot 178, which slot extends partly about skirt 180. Threaded shank 174 extends through slot 178. By translating knob 178 commensurate with the freedom of movement provided by slot 178, limited relative rotation between receiver 134 and base 132 can be effected. By inspection, it will be apparent that interconnection between passageways 140,152 in base 132 with passageways in receiver 134 will be a function of the relative rotational position of the base and the receiver. In the fully counterclockwise position (when isolator 130 is viewed from the top) passageway 200 will interconnect with passageway 140. Upon clockwise movement to approximately a mid point, inlet 214 of cross channel 210 will interconnect with outlet 144 of passageway 140 and outlet 216 of the cross channel will interconnect with inlet 156 of passageway 150. At the fully clockwise position, outlet 144 of passageway 140 will be blanked by circular end 184 and inlet 156 of passageway 150 will be similarly blanked. Accordingly, the relative rotational position between base 132 and receiver 134 will control flow from passageway 140 into cylindrical cavity 188 or into passageway 150.

Referring to FIG. 5, testing of leak detector 80 mounted in isolator 130 will be described. Quick disconnect fitting 26 at the end of hose 32 is attached to fitting 206 after insulator 130 has been mounted in housing 110 and leak detector 80 has been mounted in the isolator. Moreover, knob 176 is translated within slot 178 until the receiver is in the fully clockwise position. In this position, there is fluid communication from passageway 12 through annular channel 116 into passageway 140 via inlet 142. Passageway 140 is in fluid communication with passageway 200 and a fluid outflow through outlet 204 will occur. The fluid outflow from outlet 204 will enter apertures 84 in leak detector 80. Any fluid outflow 90 will flow into cylindrical cavity 184 and exhaust through outlet 208 into connected hose 32. To shut off flow through leak detector 80, knob 176 is urged counterclockwise to a mid point of slot 178. At this position of receiver 134 with respect to base 132, flow into passageway 140 will be channeled into cross channel 210 and exhaust through passageway 150 and into outlet 120 in housing 110. Thereafter, the flow will enter dispensing line 18 (see FIG. 1). To terminate all flow from passageway 112 (connected to the submerged pump in the storage tank), knob 176 is rotated counterclockwise to the fully counterclockwise position of slot 178. At this relative positioning between base 132 and receiver 134, circular end 184 seals the outlet of passageway 140 and flow is terminated.

Referring to FIG. 6, there is illustrated a field unit 240 containing the apparatus of the present invention. In particular, a compartment 242 receives isolator 130. The isolator is retained in place by a strap 244 removably secured by wing nuts 246 or the like. A control panel 248 has mounted therein pressure gauge 36 and selector valves 40,60. Filter 34, disposed in hose 32, is retained by a bracket 250. A beaker 252, which may be the equivalent of one of containers 72,74,76, is located beneath control panel 248 and upon floor 254 to receive outflow from one of output lines 44,66 and 70. The field unit is formed as a cabinet 260 having a pivotally attached door 262 for enclosing the components within the cabinet. A handle 264 may be attached to ease transport of the field unit.

The operation of the tester may be described as follows. An initial test is performed at gas pump 20. Quick disconnect fitting 26 is attached to tap 24. Selector valve 60 is positioned in the DLD or the PLD position, depending upon whether the installed leak detector is of the diaphragm or piston type, respectively. Selector valve 40 is positioned in the dispenser nozzle position. Pump 12 in storage tank 10 is started after container 72 (beaker 252) is placed beneath output line 70. After a steady stream of fluid has flowed into container 76, the pump is turned off. The tester components have now been flushed and the tester is ready for use after the needle in the gauge has dropped to the start position. Container 72 is emptied or replaced. To begin the test, selector valve 40 is placed in the pressure test position and pump 12 is restarted. The needle on gauge 36 should respond and settle at either the DLD or PLD position, depending upon the type of leak detector installed, for approximately two seconds. Thereafter, the needle should rise immediately to the full flow zone. In the event an older style round dome topped DLD- leak detector is used, the needle should remain in the DLD zone for five, instead of two, seconds. After pump 12 is turned off, a beaker should be placed beneath outlet line 44 and selector valve 40 is turned to the dispenser nozzle position. This will permit the fluid to flow into the container until the needle on gauge 36 returns to the start position. The amount of product contained in the container should be recorded as a check for excessive air vapor. Thereafter, the container is emptied and replaced.

With selector valve 40 in the dispenser nozzle position, pump 12 is restarted. Thereafter, selector valve 40 is turned to the three gph position and flow of fluid through output line 44 into container 72 will occur. The needle in gauge 36 should rise to the lower end of the appropriate DLD or PLD position. After one minute, approximately seven ounces (200 M.L.) should be collected in the container; the actual amount collected should be recorded. Thereafter, outlet line 44 can be directed into a five gallon container or the like and selector valve 40 is turned to the dispenser nozzle position. The needle of gauge 36 should fall below the respective zone and the flow rate should increase to approximately seven ounces per second. The reduced pressure value should be recorded. Selector valve 40 is now turned to the three gph position and the needle response in pressure gauge 36 is recorded. Thereafter, pump 12 may be turned off.

If all checks were successful, the system being tested has no leaks and the leak detector functioned normally. In the event all checks were not successful, it is necessary to test the leak detector.

In describing the operation for testing the leak detector, joint reference will be made primarily to FIGS. 2 and 5. Leak detector 80 is disengaged from housing 110 and base 132 of isolator 130 is installed in the housing. Leak detector 80 is mounted in and secured to receiver 134. In the event a piston leak detector is to be tested, overflow 94 is reconnected. Quick disconnect fitting 26 is attached to fitting 206. Prior to starting pump 12 in the storage tank, knob 176 is rotated within slot 178 to close passageway 140 and prevent outflow therefrom. Pump 12 may now be started. Knob 176 is rotated to place the isolator in the fully open position and flow will enter apertures 84 in the bottom of leak detector 80. Thereafter, the above described pressure test step is performed with the isolator in the open and closed positions. The 3 gph test can be performed as discussed above. Finally, the nozzle test can be simulated by setting selector valve 40 to the dispenser nozzle position. On completion of the tests, pump 12 is turned off and selector valve 40 is placed in the dispenser nozzle position to bleed off pressure in the line. After disconnection of quick disconnect fitting 26, leak detector 80 is removed from the isolator and the isolator is removed from housing 110. The leak detector is now replaced in the housing.

It may be noted that in the mid position of the isolator, fluid will flow into dispenser line 18 (see FIG. 1) to purge the line without requiring removal of isolator 130.

To check filter 34 for free flow therethrough, blowing on quick disconnect fitting 26 with selector valve 40 in the dispenser nozzle position will be resisted if the filter is plugged or too clogged.

By incorporating the apparatus of the present invention in a relatively compact transportable field unit 240, tests can be made at any service station without further or other special equipment. That is, the field unit is totally self contained for performing tests both at the gas pump and at the upstream side of the leak detector under test. In the event the initial test at the gas pump indicated a problem but if the leak detector test was satisfactory, a leakage problem exists somewhere between the output of the leak detector and the input at the gas pump. Various other test procedures can then be undertaken to learn more of the type, nature and location of the leak.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. Apparatus for isolating a leak detector mounted in a seat of a housing at a fuel storage tank and in fluid communication with and intermediate to the outflow of fuel from a submerged pump and a delivery line to a fuel dispenser, said apparatus comprising in combination:
   a) an isolator selectively mountable in the seat of the housing in place of the leak detector;
   b) means for mounting the leak detector in said isolator;
   c) means for interconnecting through said isolator the outflow from the submerged pump with an inlet to the mounted leak detector; and
   d) a tap extending from said isolator for discharging fuel flow from the mounted leak detector.

2. The apparatus as set forth in claim 1 including means disposed in said isolator for terminating fuel flow to the leak detector.

3. The apparatus as set forth in claim 1 including means disposed in said isolator for diverting the outflow of the submerged pump from the leak detector and to the delivery line.

4. The apparatus as set forth in claim 3 including means disposed in said isolator for terminating fuel flow to the leak detector.

5. The apparatus as set forth in claim 1 wherein said isolator includes a base for engaging the seat of the housing and wherein said mounting means comprises a receiver.

6. The apparatus as set forth in claim 5 including means disposed in said isolator for terminating fuel flow to the leak detector.

7. The apparatus as set forth in claim 6 wherein said terminating means includes means for rotatably repositioning said receiver with respect to said base.

8. The apparatus as set forth in claim 7 including means for limiting the relative rotation between said mounting means and said base.

9. The apparatus as set forth in claim 8 wherein said limiting means includes a skirt extending downwardly from said receiver and about a section of said base, a slot disposed in said skirt and a shaft extending from said base in penetrable engagement with said slot.

10. The apparatus as set forth in claim 9 wherein said receiver and includes a cavity for receiving a section of the leak detector.

11. The apparatus as set forth in claim 1 wherein the leak detector includes a chamber and a diaphragm disposed within the chamber for accommodating volumetric increase of fuel within the leak detector during leak detection testing.

12. The apparatus as set forth in claim 1 wherein the leak detector includes a cylinder and a piston for accommodating volumetric increase of fuel within the leak detector during leak detection testing.

* * * * *